US012575913B2

(12) United States Patent
Wysocki et al.

(10) Patent No.: US 12,575,913 B2
(45) Date of Patent: Mar. 17, 2026

(54) BIOACTIVE INTRAOSSEOUS DENTAL IMPLANT

(71) Applicant: Politechnika Warszawska, Warsaw (PL)

(72) Inventors: Bartlomiej Wysocki, Warsaw (PL); Agnieszka Chmielewska, Chojnow (PL); Jaroslaw Mizera, Warsaw (PL); Piotr Wychowanski, Warsaw (PL); Wojciech Swieszkowski, Warsaw (PL)

(73) Assignee: Politechnika Warszawska, Warsaw (PL)

( * ) Notice: Subject to any disclaimer, the term of this patent is extended or adjusted under 35 U.S.C. 154(b) by 162 days.

(21) Appl. No.: 17/775,196

(22) PCT Filed: Nov. 8, 2019

(86) PCT No.: PCT/PL2019/050063
§ 371 (c)(1),
(2) Date: May 6, 2022

(87) PCT Pub. No.: WO2021/091406
PCT Pub. Date: May 14, 2021

(65) Prior Publication Data
US 2022/0387143 A1　　Dec. 8, 2022

(51) Int. Cl.
*A61C 8/02* (2006.01)
*A61C 8/00* (2006.01)

(52) U.S. Cl.
CPC .......... *A61C 8/0006* (2013.01); *A61C 8/0025* (2013.01); *A61C 8/0039* (2013.01); *A61C 2008/0046* (2013.01)

(58) Field of Classification Search
CPC ....... A61C 8/00; A61C 8/0006; A61C 8/0003; A61C 8/0004; A61C 8/0012;
(Continued)

(56) References Cited

U.S. PATENT DOCUMENTS 4,542,539 A * 9/1985 Rowe, Jr. .................. A61F 2/30
606/76
4,842,517 A * 6/1989 Kawahara ............ A61C 8/0018
433/176
(Continued)

FOREIGN PATENT DOCUMENTS

CN　　101366664 B * 6/2010 ........... A61C 8/0022
CN　　205612574 U * 10/2016
(Continued)

OTHER PUBLICATIONS

CN 109223213 machine translation (Year: 2019).*
(Continued)

*Primary Examiner* — Heidi M Eide
*Assistant Examiner* — Holly T. To

(57) ABSTRACT

An intraosseous dental implant for the application of biologically active agents directly to the surrounding soft tissues and bone tissue, and their substitutes, is described. The implant enables the measurement of the newly formed or lost bone tissue volume immediately adjacent to the implant. Increasing the dynamics of osseointegration growth directly results in the possibility of reducing the duration of the entire treatment protocol. To increase dynamics of the osseointegration process, the type of material from which the implant is made, its design features, surface topography, as well as the formation of layered structures and coating applications, are described. The implant introduces growth factors and other biologically active factors that affect an increase in the dynamics of osseointegration strength. The entire implant or a porous section thereof can be produced by 3D printing through selective melting/sintering of biocompatible metallic, ceramic, or metallic-ceramic composite powders with laser or electron beams.

18 Claims, 11 Drawing Sheets

(58) Field of Classification Search

CPC ... A61C 8/0039; A61C 8/0022; A61C 8/0024; A61C 8/0025; A61C 8/0037; A61C 8/0013; A61C 2008/0046; A61B 17/86; A61B 17/7098

See application file for complete search history.

(56) References Cited

U.S. PATENT DOCUMENTS

| | | | | |
|---|---|---|---|---|
| 6,132,214 | A * | 10/2000 | Suhonen | A61C 8/0036 |
| | | | | 433/201.1 |
| 6,280,191 | B1 * | 8/2001 | Gordon | A61B 17/666 |
| | | | | 606/90 |
| 6,517,542 | B1 * | 2/2003 | Papay | A61C 8/0022 |
| | | | | 606/232 |
| 7,261,716 | B2 * | 8/2007 | Strobel | A61B 17/8625 |
| | | | | 606/232 |
| 8,231,387 | B2 * | 7/2012 | Salvi | A61C 8/0018 |
| | | | | 433/174 |
| 8,684,734 | B1 * | 4/2014 | Lyren | A61C 8/0024 |
| | | | | 433/173 |
| 8,888,828 | B2 * | 11/2014 | Belcheva | A61L 31/128 |
| | | | | 606/301 |
| 9,271,811 | B1 * | 3/2016 | Lyren | A61C 8/0018 |
| 9,713,513 | B2 * | 7/2017 | Metz-Stavenhagen | |
| | | | | A61C 8/0022 |
| 12,097,089 | B2 * | 9/2024 | Yang | B33Y 80/00 |
| 12,144,706 | B2 * | 11/2024 | Wernle | A61C 8/0025 |
| 2008/0050699 | A1 * | 2/2008 | Zhang | A61C 8/0012 |
| | | | | 433/171 |
| 2009/0011384 | A1 * | 1/2009 | Collins | A61C 8/0022 |
| | | | | 433/174 |
| 2010/0003640 | A1 * | 1/2010 | Damstra | A61C 19/04 |
| | | | | 433/201.1 |
| 2010/0042167 | A1 * | 2/2010 | Nebosky | A61M 37/00 |
| | | | | 606/301 |
| 2010/0042214 | A1 * | 2/2010 | Nebosky | A61F 2/36 |
| | | | | 604/93.01 |
| 2010/0042215 | A1 * | 2/2010 | Stalcup | A61B 17/866 |
| | | | | 606/86 R |
| 2010/0081112 | A1 | 4/2010 | Better et al. | |
| 2010/0261142 | A1 * | 10/2010 | Metz-Stavenhagen | |
| | | | | A61C 8/0039 |
| | | | | 433/174 |
| 2010/0330534 | A1 * | 12/2010 | Hyun | A61C 8/0012 |
| | | | | 433/201.1 |
| 2012/0237899 | A1 * | 9/2012 | Holmstrom | A61C 8/0001 |
| | | | | 433/201.1 |
| 2013/0017512 | A1 * | 1/2013 | Tzeng | A61C 8/0006 |
| | | | | 433/174 |
| 2014/0030675 | A1 * | 1/2014 | Sanchez | A61C 8/0012 |
| | | | | 433/174 |
| 2015/0056569 | A1 * | 2/2015 | Regev | A61C 8/0092 |
| | | | | 433/80 |
| 2015/0196371 | A1 * | 7/2015 | Westover | A61C 8/0036 |
| | | | | 433/201.1 |
| 2015/0320521 | A1 * | 11/2015 | Battula | A61C 19/06 |
| | | | | 433/173 |
| 2021/0153982 | A1 * | 5/2021 | Wernle | A61C 13/0018 |
| 2021/0330431 | A1 * | 10/2021 | Yang | A61C 8/006 |

| | | | | |
|---|---|---|---|---|
| 2022/0087788 | A1 * | 3/2022 | Selmoune | A61C 8/0024 |
| 2022/0387143 | A1 * | 12/2022 | Wysocki | A61C 8/0025 |
| 2023/0218373 | A1 * | 7/2023 | Blay | A61C 13/0019 |
| | | | | 433/201.1 |

FOREIGN PATENT DOCUMENTS

| | | | | |
|---|---|---|---|---|
| CN | 109223213 | A * | 1/2019 | |
| EP | 2 078 509 | A1 | 7/2009 | |
| EP | 3763321 | A1 * | 1/2021 | A61C 8/0022 |
| FR | 2 796 265 | A1 | 1/2001 | |
| KR | 20100005286 | A * | 1/2010 | |
| RU | 2376955 | C1 | 12/2009 | |
| RU | 117289 | U1 | 6/2012 | |
| WO | WO-2006065205 | A1 * | 6/2006 | A61B 17/866 |
| WO | WO-2013030835 | A1 * | 3/2013 | A61C 19/06 |
| WO | 2014/033375 | A1 | 3/2014 | |
| WO | WO-2018002950 | A1 * | 1/2018 | A61C 8/0025 |

OTHER PUBLICATIONS

EP 3763321 machine translation (Year: 2021).*

CN 101366664 machine translation (Year: 2010).*

KR 20100005286 machine translation (Year: 2010).*

"KR 20100005286 A translated", Lee Yong Keun (Year: 2010).*

Peng, "CN_205612574_U_translated" (Year: 2016).*

Manzano et al., "Revisiting bioceramics: Bone regenerative and local drug delivery systems," Progress in Solid State Chemistry, 40 (2012), pp. 17-30.

Kämmerer et al., "A biphasic calcium phosphate coating for potential drug delivery affects early osseointegration of titanium implants," J Oral Pathol Med. (2017) 46, pp. 61-66.

Losic et al., "Titania nanotube arrays for local drug delivery: recent advances and perspectives," Expert Opinion on Drug Delivery (2015) 12(1), pp. 103-127.

Tuukkanen et al., "Hydroxyapatite as a Nanomaterial for Advanced Tissue Engineering and Drug Therapy," Current Pharmaceutical Design, 2017, 23, pp. 3786-3793.

Albrektsson et al., "Oral Implant Surfaces: Part 2—Review Focusing on Clinical Knowledge of Different Surfaces," Int J Prosthodont. Sep.-Oct. 2004;17(5), pp. 544-564.

Ehrenfest et al., "Classification of osseointegrated implant surfaces: materials, chemistry and topography," Trends Biotechnol, 2009, pp. 198-206.

Kaluderovic et al., "Titanium dental implant surfaces obtained by anodic spark deposition—From the past to the future," Materials Science and Engineering, C 69 (2016), pp. 1429-1441.

Paolantonio et al., "Clinical and Microbiologic Effects of Subgingival Controlled-Release Delivery of Chlorhexidine Chip in the Treatment of Periodontitis: A Multicenter Study," J Periodontol. ;79(2):pp. 271-282 (Feb. 2008).

Chatvaratthana et al., "Correlation between the thickness of the crestal and buccolingual cortical bone at varying depths and implant stability quotients," PLoS One, Dec. 27, 2017;12(12):e0190293. doi: 10.1371/journal.pone.0190293, 14 pgs.

Albrektsson et al., "Oral Implant Surfaces: Part 1—Review Focusing on Topographic and Chemical Properties of Different Surfaces and In Vivo Responses to them," Int J Prosthodont. Sep.-Oct. 2004;17(5), pp. 536-543.

* cited by examiner

BIOACTIVE INTRAOSSEOUS DENTAL IMPLANT

TECHNICAL FIELD

The subject matter of the disclosure is an intraosseous dental implant for the application of biologically active agents directly to the surrounding soft tissues and bone tissue, and their substitutes, and more particularly to an intraosseous dental implant that allows the measurement of the newly formed or lost bone tissue volume immediately adjacent to the dental implant.

BACKGROUND

Intraosseous dental grafts (implants) used to rebuild lost tooth roots are known for common use. Implants as such have a conical, roller, cylindrical, or trapezoidal shape, with a screw thread or grooving on the shaft. In the upper part, they are adapted to attach a connector serving as a support for a future prosthetic superstructure. Implants are made of materials biocompatible in terms of bone tissue, in particular titanium or zirconium. The material from which the intraosseous dental implant is made guarantees, after its introduction into the recipient site in a patient, a close connection between the implant and the patient's bone tissue, called osseointegration. Due to the phenomenon of osseointegration, intraosseous dental implants enable, by means of a prosthetic superstructure fixed in their socket, transfer of occlusive loads to the bone and ensure the restoration of proper aesthetics in patients who have lost their natural teeth partially or completely. On the one hand, the phenomenon of osseointegration prevents infection spread from the infected oral environment deep into the bone tissue along the dental implant, and on the other hand, osseointegration allows the transmission of occlusion forces. The phenomenon of osseointegration develops because of the introduction of the intraosseous dental implant and depends on the apposition of the newly formed bone tissue on its surface. From a clinical point of view, it is important that the rate of osseointegration force build-up is sufficient to stabilize intraosseous dental implants. High stabilization values allow loading of intraosseous dental implants with prosthetic superstructures and termination of implant prosthetic treatment.

Increasing the dynamics of osseointegration growth directly results in the possibility of reducing the duration of the entire treatment protocol. This effect is highly anticipated by patients—the beneficiaries of therapy. To increase the dynamics of the osseointegration process in intraosseous dental implants, there is ongoing research on the type of material from which the implants are made, their design features, surface topography, as well as the formation of layered structures and coating applications.

The use of growth factors and other biologically active factors affects the increase in the dynamics of osseointegration strength in intraosseous dental implants. Substances with this effect were applied to the surface of the implants or applied through a system of hollow channels in the solid structure of the implant. (See M. Manzano, M. Vallet-Regi, *Revisiting bioceramics: Bone regenerative and local drug delivery systems*, Progress in Solid State Chemistry 40 17e30 (2012); Kämmerer et al., *A biphasic calcium phosphate coating for potential drug delivery affects early osseointegration of titanium implants*, J Oral Pathol Med. 2017 January;46(1):61-66. doi: 10.1111/jop.12464. Epub 2016 Jun. 7; Losic et al., *Titania nanotube arrays for local drug delivery: recent advances and perspectives*, Expert Opin Drug Deliv. 2015 January;12(1):103-27. doi: 10.1517/17425247.2014.945418. Epub 2014 Nov. 7; J Tuukkanen, M Nakamura, *Hydroxyapatite as a Nanomaterial for Advanced Tissue Engineering and Drug Therapy*, Curr Pharm Des. 2017; 23(26):3786-3793. doi: 10.2174/1381612823666170615105454). There is a known method of sandblasting implant surfaces with bioactive tricalcium phosphate particles of various diameters, which increases the level of implant integration with bone due to the obtained porosity. (See T Albrektsson, A Wennenberg, *Oral implant surfaces: Part 2—review focusing on clinical knowledge of different surfaces*, Int J Prosthodont. 2004 Sep-Oct;17(5): 544-64). Surface porosity can also be obtained through known techniques of acid etching, anodizing etc. (See *id.*, at 536-43; D M Dohan Ehrenfest et al., *Classification of osseointegrated implant surfaces: materials, chemistry and topography*, Trends Biotechnol, 2009). The surface porosity at the nano and micro level maximizes the penetration of biological fluids immediately after implantation and significantly increases the BIC (bone to implant contact) growth dynamics, enabling faster loading of the implant and increasing its maximum value, allowing the implant to transfer larger occlusive loads after the end of the osseointegration process (Kaluderović et al., *Titanium dental implant surfaces obtained by anodic spark deposition— From the past to the future*, Mater Sci Eng C Mater Biol Appl. 2016 Dec. 1; 69:1429-41. doi: 10.1016/j.msec.2016.07.068. Epub 2016 Jul. 26).

However, the porous surface and canal formation in the solid implant structure are imperfect methods. The application of growth factors to the surface of the implant is subject to significant quantitative restrictions, prevents long-term effects (short half-life and reapplication possibilities), and is often ineffective due to the abrasion of these substances from the implant surface as early as at the stage of its introduction into the bone saddle. On the other hand, the application of biological agents through a hollow channel system is associated with a very limited volume possible for single application. In addition, these channels, when contacted with condensed bone tissue during insertion of the intraosseous dental implant, practically prevent the biological agent from entering the surrounding bone tissue, often limiting its interaction only to the direct contact of the canal outlet with the surface of the patient's bone tissue. Hollow channels in implants were often obstructed immediately after implant insertion or very quickly in the initial phase of bone tissue growth, preventing reapplication of a biologically active agent.

Inflammation often develops around the implant during the use of intraosseous dental implants. The phenomenon called periimplantitis is one of the most common reasons of reducing the time of using intraosseous dental implants, while being the most common cause of losing integrated implants. Treatment of this phenomenon is difficult, and the prognosis is doubtful. In periimplantitis therapy, surgical procedures, as well as photodynamic therapy and lasers, are used to clean the surfaces of the re-infected implant. These are highly invasive techniques. Pharmacotherapy is also a recognized treatment method for this condition. Drugs and biologically active agents are applied directly to the gingival pocket surrounding the implant. This method has little precision and is exposed to ineffectiveness as a result of leaching the preparation with saliva directly into the patient's oral cavity. (See Paolantonio et al., *Clinical and microbiologic effects of subgingival controlled-release delivery of chlorhexidine chip in the treatment of periodontitis: a multicenter study*, J Periodontol.;79(2):271-82., Feb 2008). Attempts to administer biologically active preparations through the implant shaft, using a system of bored channels, are ineffective against their obstruction occurring as a result of the implant's primary osseointegration.

The correct stability of intraosseous dental implants is a key phenomenon enabling the proper transmission of occlusion forces in prosthetic superstructures based on them. A precise assessment of the implant stabilization force in the bone and the dynamics of changes in this parameter enables assessment of the effectiveness and safety of prosthetic implant treatment and is an important predictor of its longevity. The stabilization of intraosseous dental implants can be divided into primary, dependent on mechanical fixation in the implant bone immediately after insertion into a dedicated saddle, and secondary, resulting from the developing phenomenon of implant osseointegration. Measurements of the latter are possible on intravital basis only indirectly and are performed by means of the tilting analysis of a mechanically activated implant or by the vibration resonance analysis technique. (See Chatvaratthana et al., *Correlation between the thickness of the crestal and buccolingual cortical bone at varying depths and implant stability quotients*, PLoS One, 2017 Dec. 27;12(12):e0190293. doi: 10.1371/journal-.pone.0190293. eCollection 2017). However, neither technique indicates the amount of bone growing or resorbed around the implant.

BRIEF SUMMARY

From a clinical point of view, the prior art presented illustrates three important technical problems solved by the presented invention. The first problem is the possibility of repeated, non-traumatic (from the patient's and tissues' point of view) application of biologically active agents to the tissues and biomaterials directly surrounding the intraosseous dental implant. The second problem is the ability to precisely measure changes in the volume of bone surrounding and then overgrowing individual structural components of the implant or tissue resorbed around it. The third problem is the possibility of applying unstable coatings or layers or even colonizing the dental titanium implant surface with the recipient cells.

The intraosseous dental implant according to the invention has a solid shaft and a solid thread with variable height and pitch. In the middle part, the shaft has a reduced diameter in relation to the diameter of the shaft in the upper and lower part. Part of the implant in the area with reduced shaft diameter is made of material with open porosity from 0.1% to 90%, and with a pore diameter in the range of 0.3 µm to 1000 µm. In addition, the implant has at least two internal channels, of which at least one channel begins in the implant socket and has an outlet at the bottom of the implant (e.g., extends between the implant socket and the bottom of the implant), and at least one channel connects to the channel beginning in the implant socket and has an outlet in the porous section of the implant.

The middle part of the implant shaft may have a reduced diameter of at least two different dimensions.

Preferably, at least one channel is located axially along the implant, and at least one channel located at an angle of 1-179 degrees relative to the axial channel is connected to this channel. Preferably, the channels have a diameter in the range of 0.3-3000 µm.

Preferably, the implant has a cylindrical shape, a conical shape, or a cylindrical-conical shape.

The implant may have a controlled or random distribution of the shape and size of the pores along and across the implant. The pores can have a spherical or nearly-spherical shape or the shape of elemental cells (cube, octahedron, diamond cell, etc.).

Preferably, the implant may have spiral recesses in the lower part and/or in the porous part, in which channel outlets are preferably provided for delivery of biologically active agents. Preferably, the number of recesses can be up to 5.

Preferably, the implant may be covered in its entirety or in part with a bioactive layer based on calcium phosphate or an osseointegration-enhancing layer. The implant may also be colonized with cells or have carriers of drugs or active substances applied.

Preferably, the solid implant thread may be single or double and have a pitch in the range of 0.1 to 5 mm. The thread also constitutes ribbing (reinforcement) of the porous implant. Preferably, the thread height is in the range of 0.01 to 3 mm. The thread edge can be constant or variable over the entire thread length, both for double and single threads. The thread can have a triangular, trapezoidal symmetrical, trapezoidal asymmetrical, tubular, or round shape. The thread opening angle can be constant or variable over the entire length of the implant and can have an angular range from 1 to 180°. To increase the implant's stability in the compacted bone plate, its upper part will have a thread that is a continuation of the thread in the remaining part of the implant with the same or different height and pitch, or recesses resembling a milling cutter shaper, with a depth of 0 to 2 mm The entire implant or porous section of the implant according to the invention can advantageously be produced by 3D printing through selective melting/sintering of bio-compatible metallic, ceramic, or metallic-ceramic composite powders with a laser or electron beam. The materials of the implant according to the invention are preferably titanium or its alloys, tantalum, magnesium, alumina ceramics, $Al_2O_3ZrO_2$, or combinations of these materials, i.e., metal-ceramic composites, in which the metal is the matrix for the ceramic particles. After the manufacturing process, the channels and pores in the implant are cleaned/unblocked chemically or electrochemically from un-melted material particles, e.g., in the case of production from titanium and its alloys, post-process purification can be performed in a mixture of $HF/HNO_3$ acids. In addition, the implant can be subjected to a chemical anodizing process to produce $TiO_2$ nanotubes or other TiOX stoichiometry.

The intraosseous implant according to an embodiment of the invention has a triple-zone structure in the vertical direction, with reduced shaft diameter in the middle section. The reduction of the shaft diameter leaves space for the porous section of the implant with controlled open porosity. The system of connected channels inside the implant, starting with an inlet in the implant socket and having outlets preferably on individual surfaces of the implant, or at least on the surface of the porous part, allows repeated, non-traumatic administration of biologically active agents to the implant socket without the need for surgical procedures. For this purpose, it is only required to unlock the implant socket by unscrewing the scar-screw, healing screw, or abutment. In particular, the application of biologically active agents is possible due to the volume of space contained in the porous central part of the implant. Due to this design, the outlet openings of the implant shaft system cannot be blocked by condensed bone when inserting the implant into its saddle. The application of biologically active agents is both possible at the stage of osteogenesis occurring in the implant healing phase, and osteolysis occurring during the periimplantitis phenomenon.

In the implant according to an embodiment of the invention, it was possible to apply coatings, layers, or cells on the porous part of the implant and on the internal surface of the channels, so that the porous part and internal surfaces do not get damaged or rubbed off during the implant insertion into the bone saddle and can play their role conditioning the osseointegration process and secreting drugs or bioactive agents created by them or contained in them.

An important feature of the invention is the ability to measure the volume of ingrown or resorbing bone around the implant by measuring the volume of fluid necessary to fill the implant shaft system and the porous part thereof. The bone growing in the osseointegration process into the porous space of the central part of the implant will reduce its free space available to fill with fluid. In contrast to this process, the free space created during periimplantitis by osteolysis of bone tissue will increase the volume needed to fill this part of the implant.

In particular, the system of connected tubules located inside the implant enables several benefits. A first benefit is non-invasive and targeted delivery (administration) of various agents from the outside to the tissues surrounding the implant, e.g., growth factors, drugs including antibacterial, antineoplastic drugs, cell therapy, to accelerate osseointegration, bone formation, treatment of the tissue area around the implant in the event of any lesions (bacterial contamination, bone loss around the implant), etc. A second benefit is monitoring and measuring the concentration and activity of biological agents in the implant area by collecting and analyzing fluids from the implant surroundings. A third benefit is monitoring and measuring the amount of bone grow into implant indirect implant osseointegration) by measuring the amount and pressure of fluid introduced into the tubules. A fourth benefit is cooling the implant while screwing it into the mandible by inserting coolant into the implant tubules.

An implant according to the invention can simultaneously retain all the desired mechanical and biological features of the currently used dental implants.

BRIEF DESCRIPTION OF THE DRAWING

An implant according to embodiments of the invention is shown in the figures.

FIGS. 3-3E show views of an implant according to Example A, wherein FIG. 3 shows a side view of the implant, FIG. 3D shows a cross section along line D-D of FIG. 3, and FIG. 3E shows a cross section along line E-E of FIG. 3.

FIGS. 4-4F show views of an implant according to Example B, wherein FIG. 4 shows a side view of the implant, FIG. 4B shows a cross section along line B-B of FIG. 4, FIG. 4C shows a cross section along line C-C of FIG. 4, FIG. 4D shows a cross section along line D-D of FIG. 4, FIG. 4E shows a cross section along line E-E of FIG. 4, and FIG. 4F shows a cross section along line F-F of FIG. 4.

FIGS. 5-5D show views of an implant according to Example C, wherein FIG. 5 shows a side view of the implant, FIG. 5B shows a cross section along line B-B of FIG.

5, FIG. 5C shows a cross section along line C-C of FIG. 5, and FIG. 5D shows a cross section along line D-D of FIG. 5.

DETAILED DESCRIPTION

Example A

Figure 1:
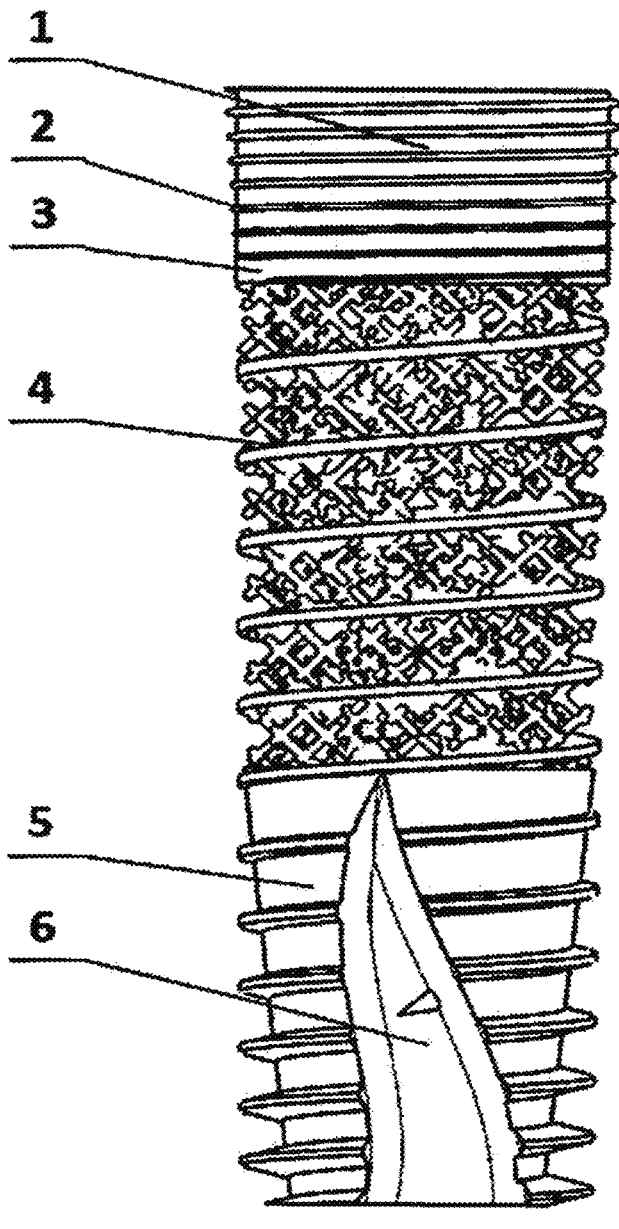
FIG. 1 shows a side view of an implant.
Figure 2:
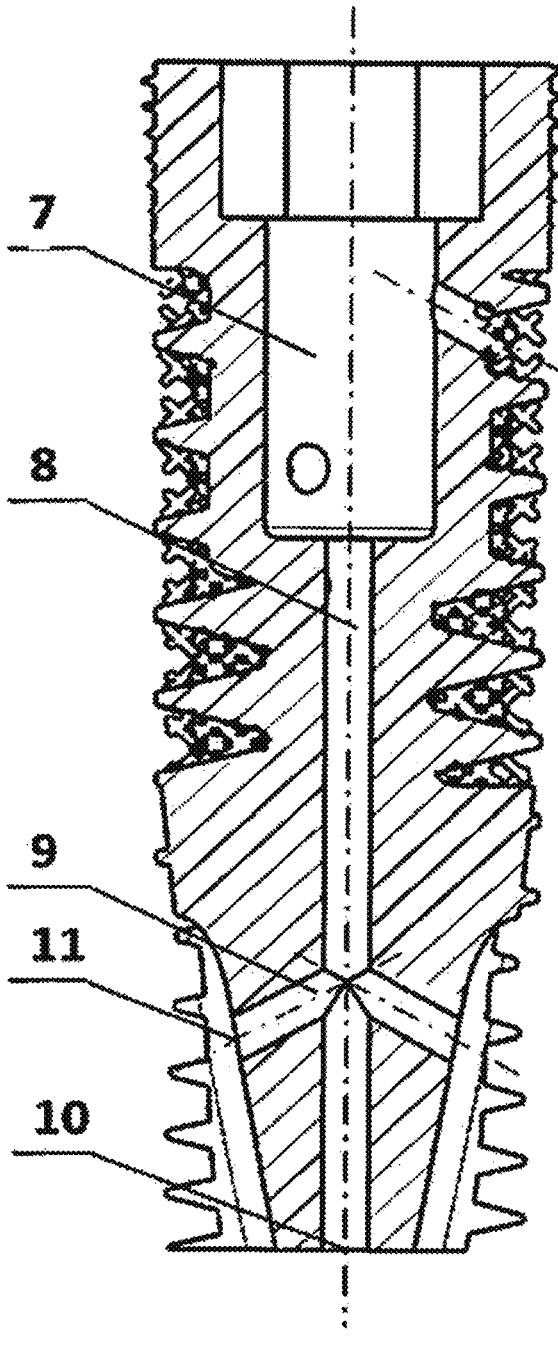
FIG. 2 shows a longitudinal section of the implant shown in the view in FIG. 1.

The implant according to the invention shown in the embodiment in FIGS. 1-3E has a conical shape with a length of 11.5 mm. The solid shaft 1 has a thread 2. The solid upper part 3 of the implant has a length of 2 mm and an upper diameter of 3.75 mm, the central porous part 4 has a length of 5 mm, and the solid lower part 5 has a length of 4.5 mm. A portion of the thread 2 located in the lower part 5 and the porous part 4 has a variable pitch in the range of 1 to 2 mm and a variable edge thickness from 0.05 to 0.15 mm. In the upper part 3, the thread 2 has a constant pitch of 0.2 mm and a variable thread height from 0.0 I to 0.125 mm. The porous part 4 has pores with a gradient size from 0.5 mm at the outer edge of the implant to 0.2 mm looking towards the implant axis. The porosity of the porous part 4 having pores with a gradient size of 0.5 mm is 52%, and the porosity of the porous part 4 having pores with a gradient size of 0.2 mm is 89%. The solid shaft I in the central porous part 4 has a diameter of 1.5 mm in the lower part and 2.5 mm in the upper part that forms an opening intended for supporting an implant socket 7. The lower part of the implant has two spiral recesses 6.

Along the main axis of the implant from the implant socket 7 to the extreme lower surface of the implant, there is a main supply channel 8 with a diameter of 0.4 mm and with an outlet 10. The lateral supply channels 9 extend from the main supply channel 8. Three channels of the lateral supply channels 9 are located in the central part 4 and are inclined to the main axis of the implant at an angle of 60°, are arranged relative to the transverse axis at angles of 240° (B-B cross-section), 120° (C-C cross-section), and 0° (D-D cross-section), and have respective endings 11 open in the porous area 4. Two side channels are located in the lower part 5 and are directed at an angle of 60° to the implant axis. The two side channels have an end 11 in spiral recesses 6 (one in each) and arranged in relation to the transverse axis at 0° and 180° (E-E cross-section). The implant is made by 3D printing from Ti6Al4V alloy powder (Grade 5).

Figure 3:
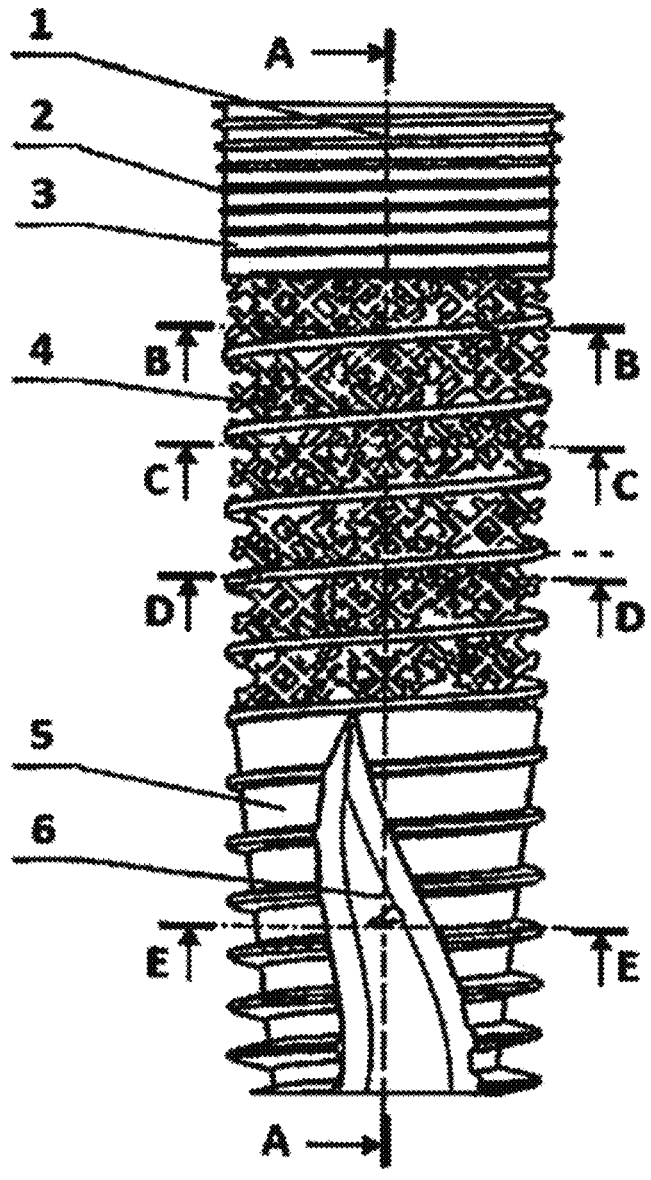
Figure 3A:
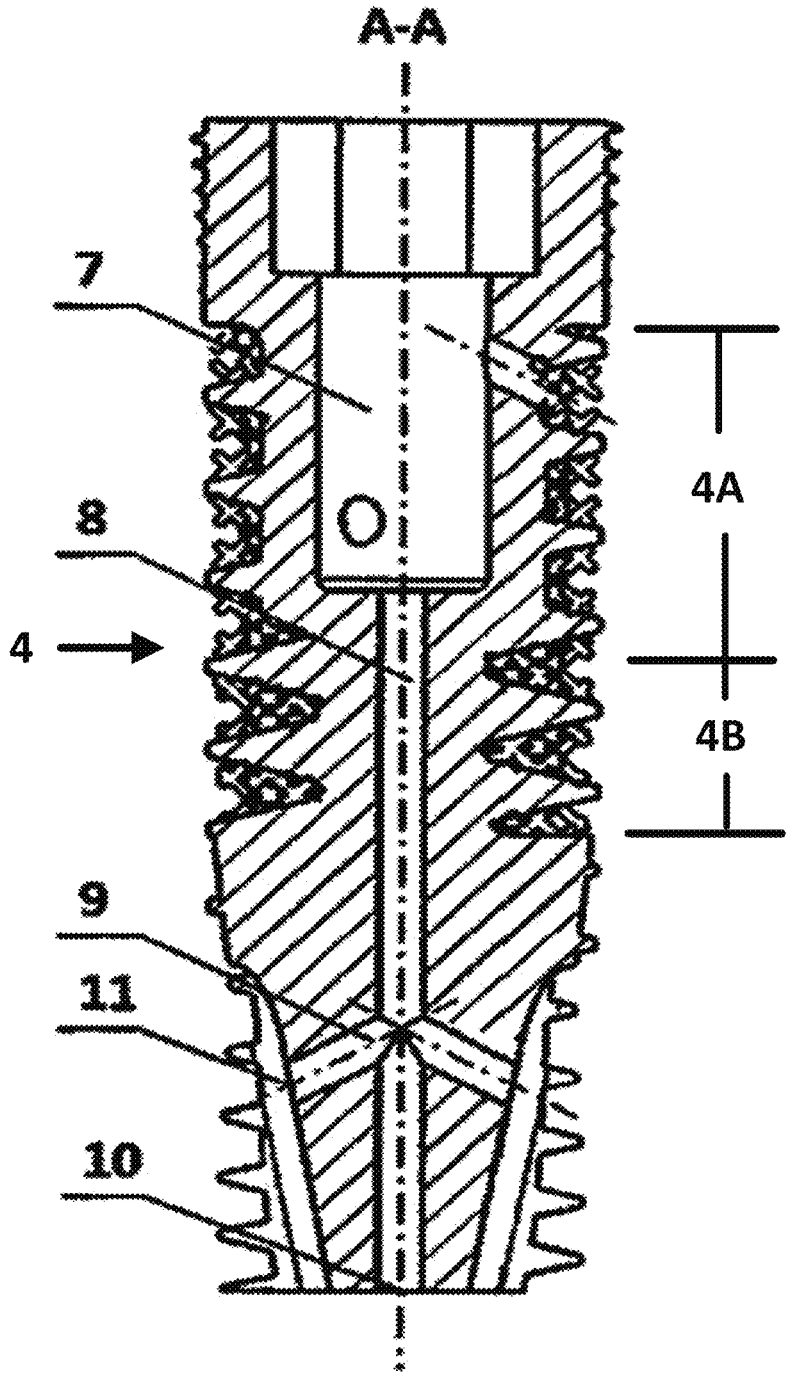
FIG. 3A shows a cross section along line A-A of FIG. 3.
Figures 3B, 3C:
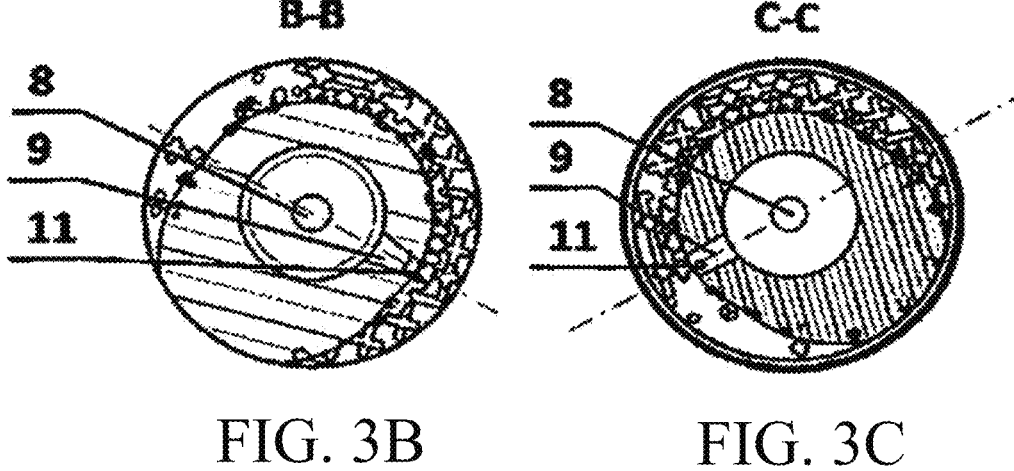
FIG. 3B shows a cross section along line B-B of FIG. 3.
FIG. 3C shows a cross section along line C-C of FIG. 3.
Figures 3D, 3E:
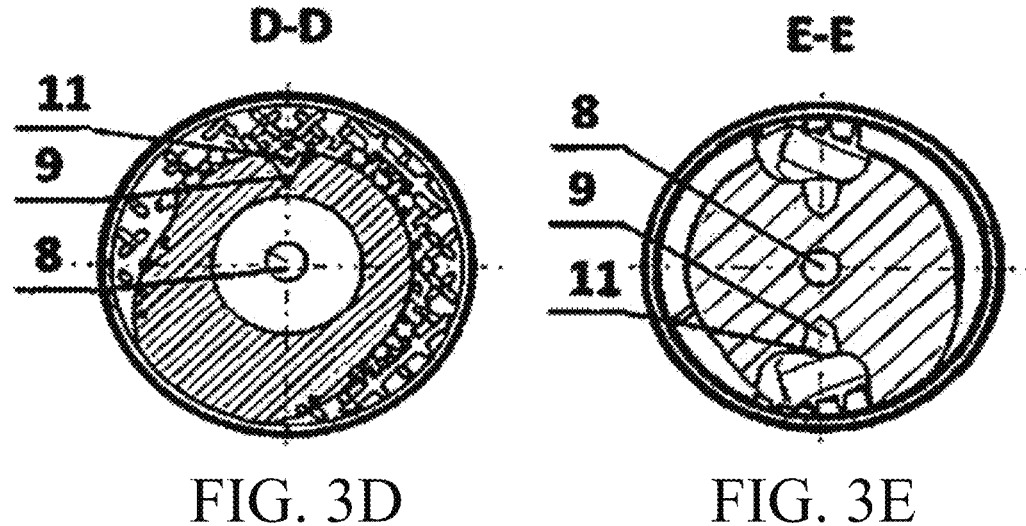

As shown in amended FIG. 3A, the solid shaft 1 in the central part 4 of the implant may have a reduced diameter of at least two different dimensions. In the FIG. 3A example, the central part includes an upper portion 4A having a first diameter and a lower portion 4B having a second diameter smaller than the first diameter.

Example B

Figure 4:
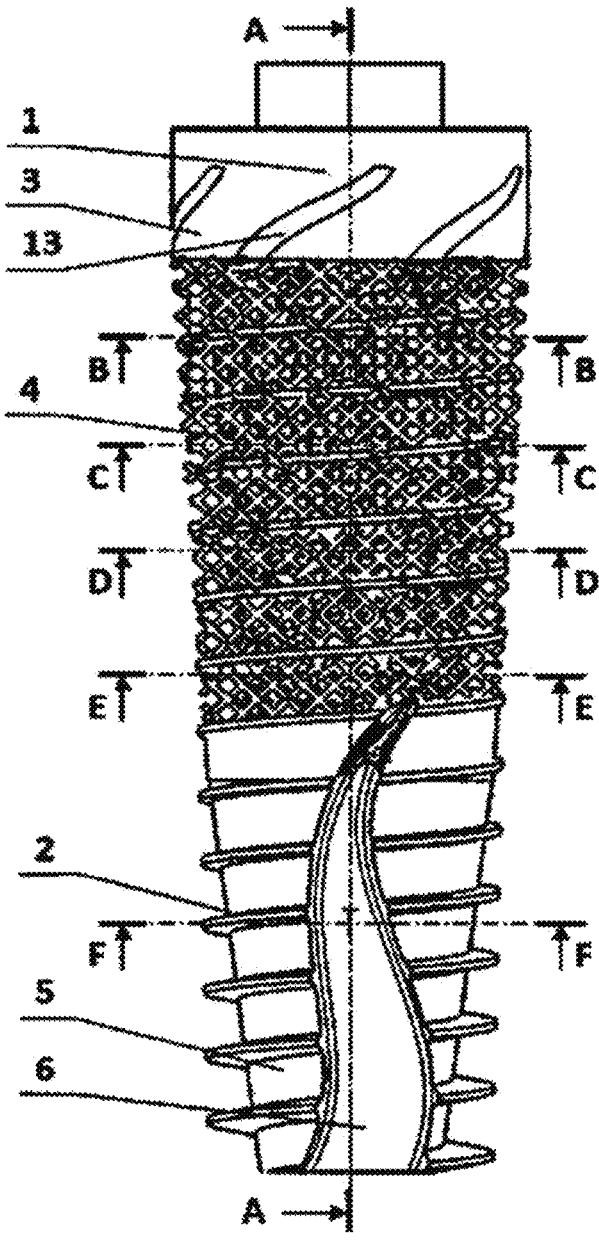
Figure 4A:
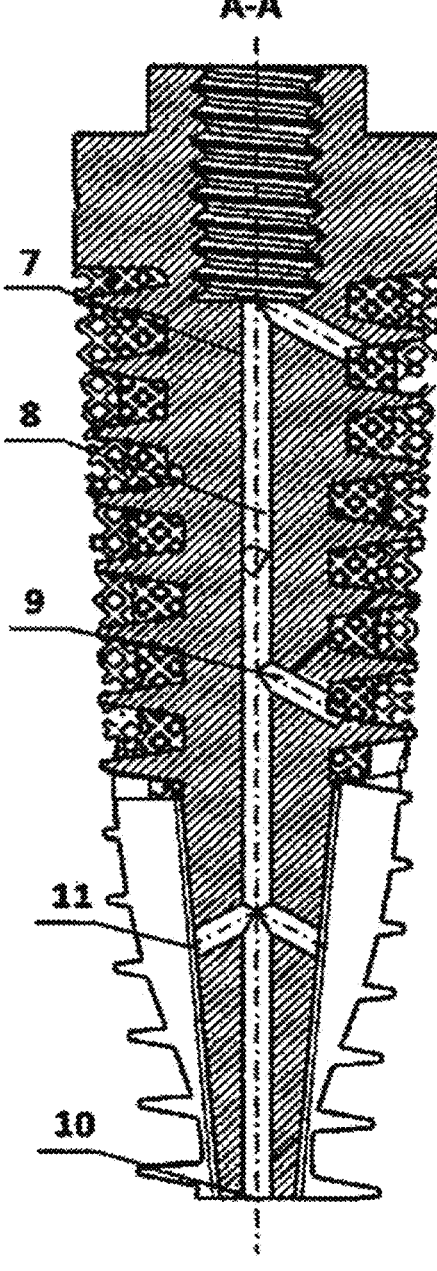
FIG. 4A shows a cross section along line A-A of FIG. 4.
Figures 4B, 4C, 4D, 4E, 4F:
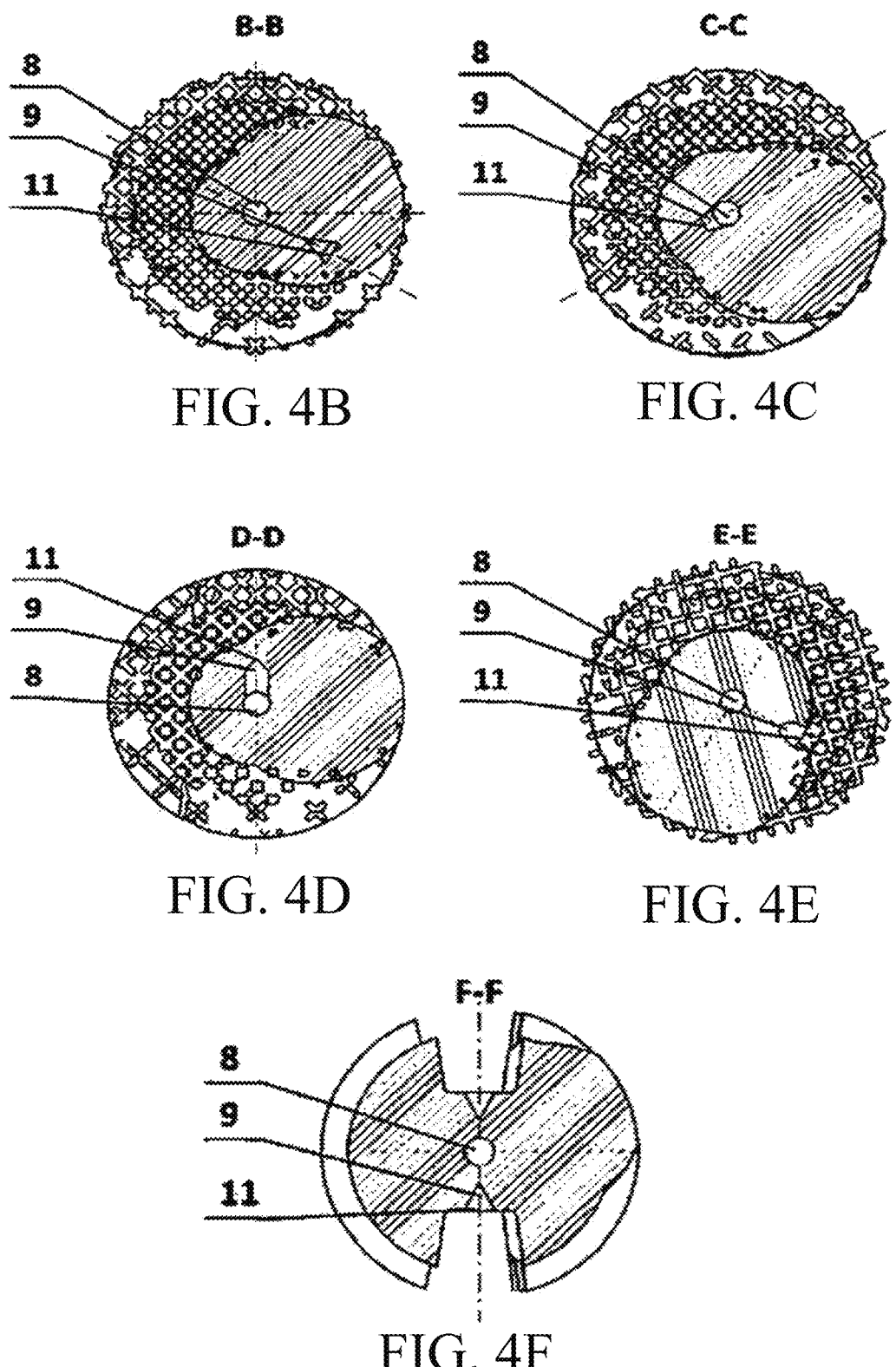

The implant according to the invention shown in the embodiment in FIGS. 4-4F has a conical shape and is 16 mm long. The solid shaft 1 has a thread 2. The solid upper part 3 of the implant has a length of 2 mm and an upper diameter of 5 mm, the central porous part 4 has a length of 8 mm, and the solid lower part 5 has a length of 6 mm. The lower part 5 and the porous part 4 have a thread 2 with a constant pitch of 1 mm and a constant edge thickness of 0.03 mm. In the upper part 3, there are recesses 12 of a trapezoidal shape with a depth of Oto 0.2 mm. The porous part 4 has pores with a gradient size from 0.7 mm at the outer edge of the implant to 0.5 mm looking towards the implant axis. The porosity of the porous part 4 having pores with a gradient size of 0.7 mm is 69%, and the porosity of the porous part 4 having pores with a gradient size of 0.5 mm is 75%. The solid shaft 1 in the central porous part 4 has a diameter of 1.5 mm in the lower part and 2.5 mm in the upper part that forms an opening intended for supporting the implant socket 7. In the lower part 5 and the porous part 4, there are two spiral recesses 6.

Along the main axis of the implant from the implant socket 7 to the extreme lower surface of the implant, there is a main supply channel 8 with a diameter of 0.4 mm and with an outlet 10. The lateral supply channels 9 depart from the main supply channel 8, wherein four channels lateral supply channels 9 are located in the central part 4, are inclined to the main axis of the implant at an angle of 60°, are arranged relative to the transverse axis at an angle of 240° (B-B cross-section), 120° (C-C cross-section), 0° (D-D cross-section), and 240° (F-F cross-section). and have an ending 11 open in the porous area 4. Two of the lateral supply channels 9 are in the lower part 5 and are directed at an angle of 60° to the main axis of the implant, have an ending 11 in spiral recesses 6 (one in each), and are arranged in relation to the transverse axis at 0° and 180° (F-F cross-section). The implant is made by 3D printing from Grade 2 titanium powder.

Example

Figure 5:
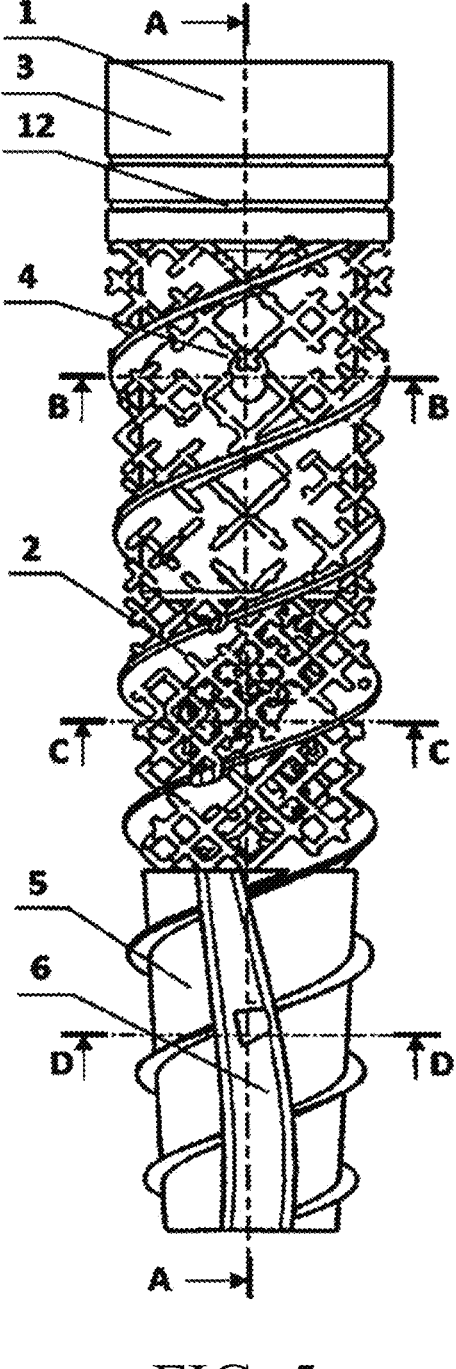
Figure 5A:
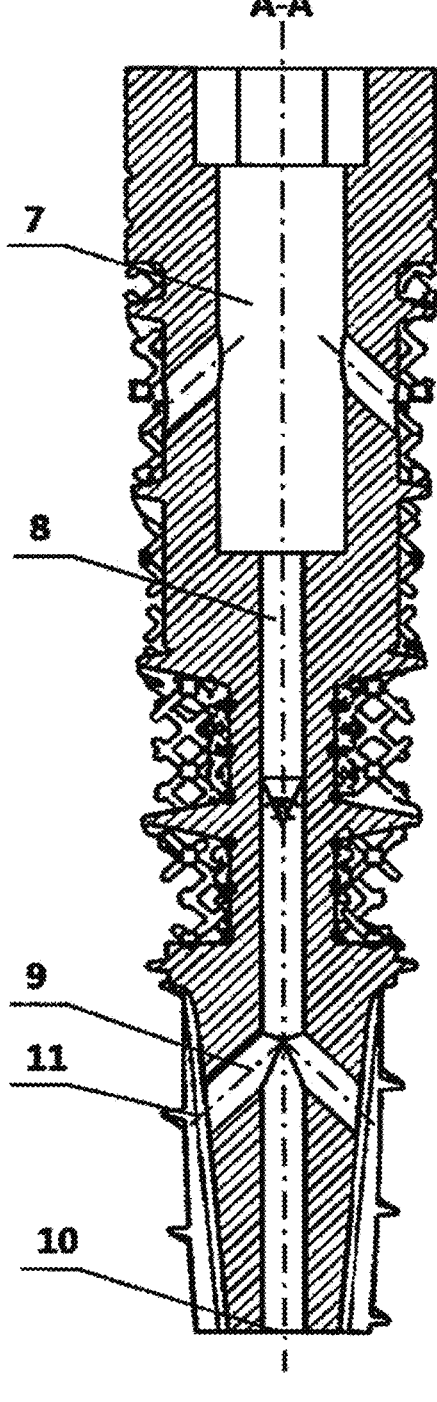
FIG. 5A shows a cross section along line A-A of FIG. 5.
Figures 5B, 5C, 5D:
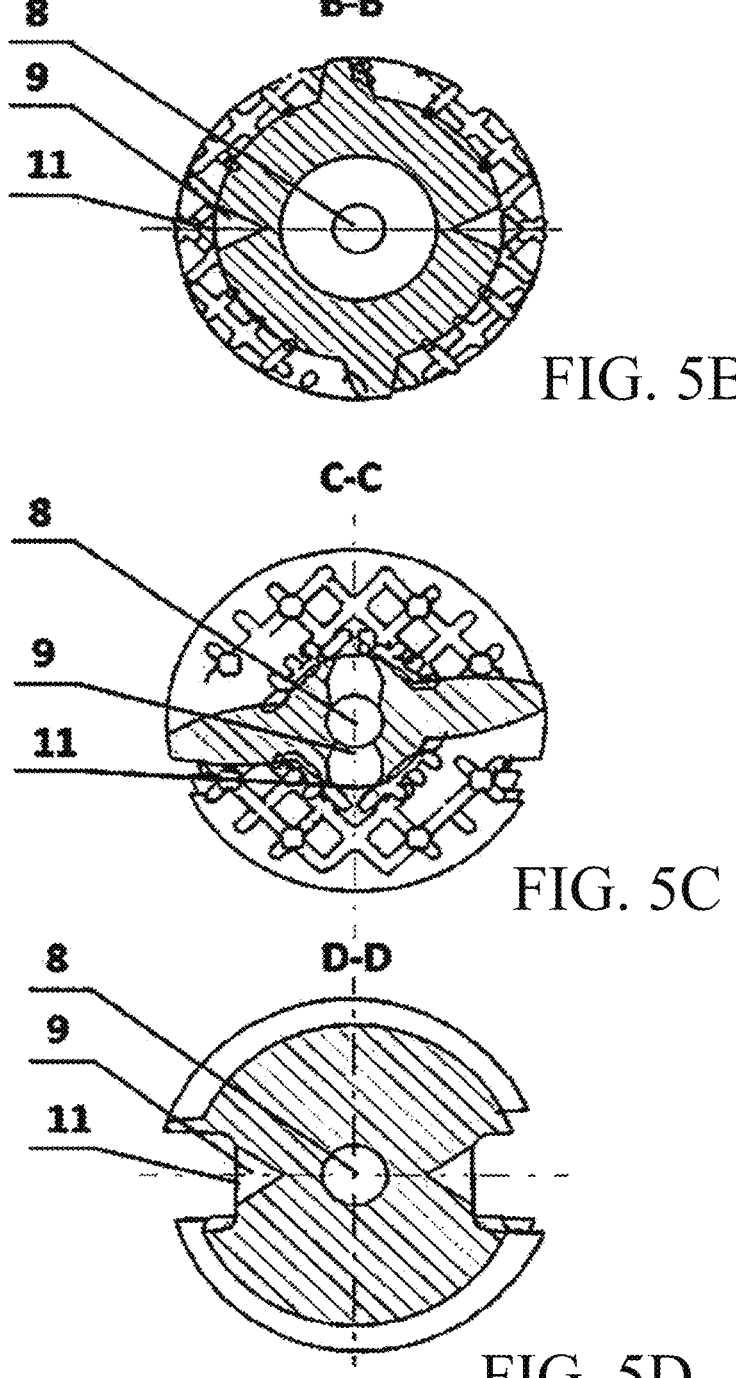

The implant according to the invention shown in the embodiment in FIGS. 5-5D has a conical shape with a length of 13 mm. The solid shaft 1 has a thread 2. The solid upper part 3 has a length of 2 mm and an upper diameter of 2.9 mm. The central porous part 4 is 6.5 mm long. The solid lower part 5 has a length of 4.5 mm. The lower part 5 and the porous part 4 have a double thread with a variable pitch in the range of 4 to 2 mm and a variable edge thickness from 0.04 to 0.1 mm. In the upper part 3 there are millings 13 with a semicircular shape, 0.05 mm deep and oriented perpendicular to the implant axis. The porous part 4 has pores with a gradient size from 0.5 mm at the outer edge of the implant to 0.2 mm looking towards the implant axis. The porosity of the porous part 4 having pores with a gradient size of 0.5 mm is 61%, and the porosity of the porous part 4 having pores with a gradient size of 0.2 mm is 83%. The solid shaft 1 in the central porous part 4 has a diameter of 1 mm with a thickening for supporting the implant socket 7 having a diameter of 2.2 mm. The lower part 5 has two spiral recesses 6. Along the main axis of the implant from the implant socket 7 to the extreme lower surf ace of the implant, there is a main supply channel 8 with a diameter of 0.4 mm and with an outlet 10. The lateral supply channels 9 depart from the main supply channel 8, wherein four of them are located in the central part 4 and are inclined to the main axis of the implant at an angle of 45°. The lateral supply channels 9 are arranged relative to the transverse axis at angles of 90° and 270° (B-B cross-section) and 0° and 180° (C-C cross-section) and have an open ending 11 in the porous area 4. Two of the lateral supply channels 9 are in the lower part 5 and are directed at an angle of 45° to the main axis of the implant, have endings 11 in spiral recesses 6 (one in each), and are arranged with respect to the transverse axis at angles of 90° and 270° (D-D cross-section). The implant is made by 3D printing from AhO3 corundum ceramics.

The invention claimed is:
1. An intraosseous dental implant, comprising:
a shaft having a central part located between an upper part and a lower part;

a thread with a variable height and pitch arranged about the shaft; and
at least two internal channels in the shaft including a first internal channel that extends axially from an opening in the upper part for supporting an implant socket to an outlet at an opposing end of the lower part and a second internal channel in communication with the first internal channel, the second internal channel extending from the first internal channel and having an outlet in the central part, wherein:
in the central part, the shaft has a reduced diameter in relation to a diameter of the shaft in the upper part and the lower part, the reduced diameter of the central part of the shaft comprising:
an upper portion axially adjacent to the upper part of the shaft, the upper portion having a first diameter; and
a lower portion axially adjacent to the lower part of the shaft, the lower portion having a second diameter smaller than the first diameter; and
a material extending radially outward of the reduced diameter of the shaft in the central part has an open porosity from 0.1% to 90% and a pore diameter in a range from 0.3 μm to 1000 μm, the material is in communication with the outlet of the second internal channel, wherein the outlet of the second internal channel is positioned radially inward from an outer surface of the material thereby preventing the outlet of the second internal channel from being blocked by resident condensed bone surrounding the outer surface of the material during installation, wherein a height of the thread in the lower portion is larger than the height of the thread in the upper portion providing a greater radial depth of the material in the lower portion than in the upper portion.

2. The intraosseous dental implant according to claim 1, wherein the second internal channel extends from the first internal channel at an angle of 1-179 degrees with respect to the first internal channel.

3. The intraosseous dental implant according to claim 1, wherein each of the at least two internal channels has a diameter in a range of 0.3-3000 μm.

4. The intraosseous dental implant according to claim 1, wherein at least one of the lower part or the central part has spiral recesses in a curved, outer surface of the lower part or the central part.

5. The intraosseous dental implant according to claim 4, wherein the second internal channel comprises two lateral supply channels each having an outlet, wherein each of the spiral recesses has the outlet from one of the two lateral supply channels through the respective curved, outer surface of the lower part.

6. The intraosseous dental implant according to claim 1, wherein the shaft is a solid shaft at the upper part, is a solid shaft at the lower part, and is a solid shaft at the reduced diameter of the central part.

7. The intraosseous dental implant according to claim 1, wherein the thread of the shaft continuously extends along the upper part, the central part and the lower part, and wherein the thread on the upper part has a different height and pitch than the thread in the central part and the lower part.

8. The intraosseous dental implant according to claim 1, comprising:
a bioactive layer based on calcium phosphate or an osseointegration-enhancing layer that covers at least a part of the shaft and the thread.

9. The intraosseous dental implant according to claim 1, wherein the second internal channel comprises three channels inclined to a main axis of the shaft at an angle of 60° and are arranged relative to a transverse axis of the shaft at angles of 240°, 120°, and 0°, wherein the three channels are axially spaced from one another along the main axis.

10. The intraosseous dental implant according to claim 1, wherein the second internal channel comprises four channels inclined to a main axis of the shaft at an angle of 45° and are arranged relative to a transverse axis of the shaft at angles of 90°, 270°, 180°, and 0°.

11. The intraosseous dental implant according to claim 1, wherein the thread in the lower part has a constant pitch and a constant edge thickness.

12. The intraosseous dental implant according to claim 1, comprising:

two spiral recesses located along the shaft from the central part to respective endings through the lower part arranged relative to a transverse axis of the shaft at angles of 90° and 270°.

13. The intraosseous dental implant according to claim 1, wherein the thread of the shaft continuously extends along the central part and the lower part, and wherein the implant further comprises a thread located at the upper part that has a constant pitch and a variable thread height.

14. The intraosseous dental implant according to claim 1, wherein the material comprises pores with a gradient size at an outer edge larger than a gradient size of pores towards an axis of the shaft.

15. The intraosseous dental implant of claim 1, wherein the open porosity of the material defines a void space and the second internal channel is configured to allow a supply of a biologically active agent from the first internal channel to the material and into the void space in the material in the central part, wherein the first internal channel, the second internal channel, and the material are configured to allow a measurement of ingrown or resorbing bone around the installed intraosseous dental implant through a measurement of a volume of a fluid needed to fill the first internal channel, the second internal channel and the void space remaining in the material.

16. An intraosseous dental implant, comprising:

a shaft having a main axis comprising:

a solid upper part defining an opening at an upper end;

a solid lower part having an opposing lower end; and a solid central part located between the solid upper part and the solid lower part along the main axis, the solid central part having a reduced outer diameter relative to an outer diameter of the shaft in the solid upper part and an outer diameter of the shaft in the solid lower part, the solid central part of the shaft comprising:

a solid upper portion axially adjacent to the solid upper part of the shaft, the solid upper portion having a first outer diameter; and a solid lower portion axially adjacent to the solid lower part of the shaft, the solid lower portion having a second outer diameter smaller than the first outer diameter;

a spiral thread having flutes formed in each of the solid upper part, the solid central part, and the solid lower part of the shaft extending parallel to the main axis;

a porous material positioned in the central part axially between the flutes of the spiral thread of the solid central part, the porous material is integrally formed with the solid central part of the shaft, the porous material extending radially outward from the solid central part of the shaft, the porous material having an open porosity from 0.1% to 90% defining a void space and a pore diameter in a range from 0.3 μm to 1000 μm, wherein a radial height of the spiral thread in the solid lower portion is larger than the radial height of the spiral thread in the solid upper portion providing a greater radial depth of the porous material in the solid lower portion than in the solid upper portion;

at least two internal channels defined by the shaft configured to allow a supply of a biologically active agent from the opening at the upper end of the solid upper part of the shaft to respective outlets of the at least two internal channels, the at least two internal channels comprising:

a first internal channel extending from the opening in the solid upper part to the outlet at the opposing lower end of the solid lower part; and at least one second internal channel in communication with the first internal channel and extending to the outlet in communication with the porous material, the outlet of the at least one second internal channel is positioned radially inward from an outer surface of the porous material thereby preventing the outlet of the at least one second internal channel from being blocked by resident condensed bone surrounding the outer surface of the porous material during installation, the at least one second internal channel configured to allow the supply of the biologically active agent from the first internal channel to the porous material and into the void space, wherein the first internal channel, the at least one second internal channel, and the porous material are configured to allow measurement of ingrown or resorbing bone around the installed implant through measurement of a volume of a fluid needed to fill the first internal channel, the at least one second internal channel and the void space remaining in the porous material.

17. The intraosseous dental implant of claim 16, wherein the at least one second internal channel comprises at least two lateral supply channels each extending downwardly at an angle from the first internal channel and having the outlet in communication with the porous material, the at least two second internal channels are axially separated along the main axis and angularly spaced relative to a transverse axis of the shaft.

18. The intraosseous dental implant of claim 17, wherein the solid lower part of the shaft further comprises a spiral recess formed in the solid lower part, and wherein the at least one second internal channel further comprises a lateral supply channel extending downwardly at an angle from the first internal channel and having an outlet through the spiral recess.

* * * * *